May 1, 1956     J. B. SETCHFIELD     2,744,239
ARRANGEMENT FOR MEASURING THE POWER TRANSMITTED
THROUGH AN ELECTROMAGNETIC WAVEGUIDE
Filed Aug. 20, 1952
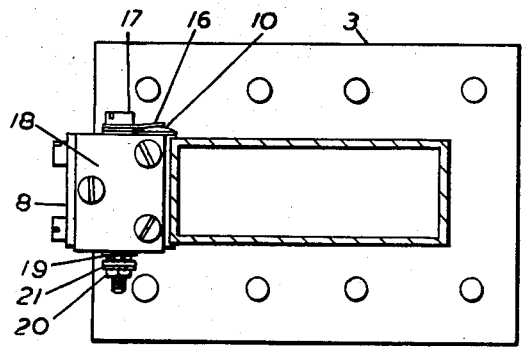
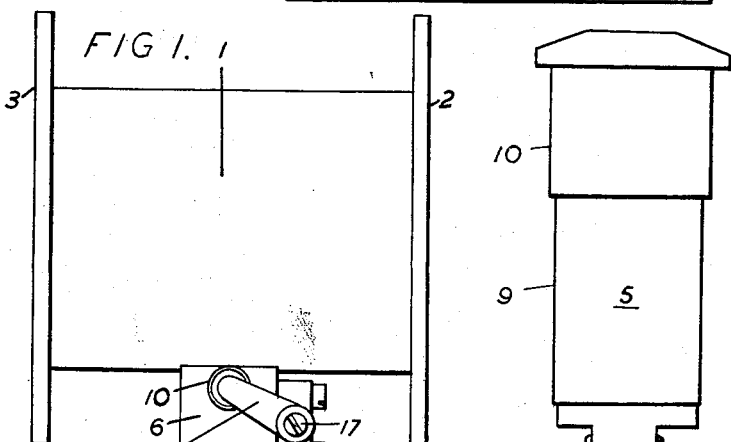
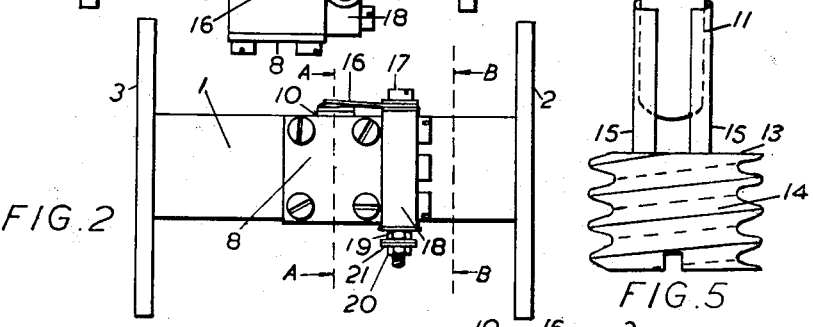
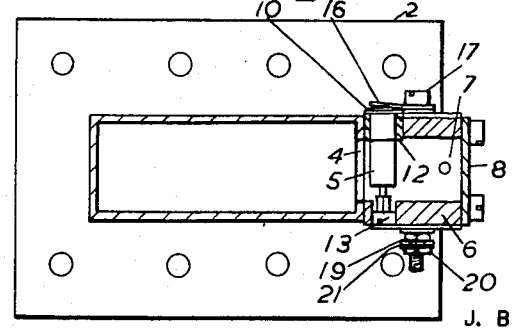
Inventor
J. B. SETCHFIELD
By Philip M. Bolton
Attorney United States Patent Office 2,744,239
Patented May 1, 1956

2,744,239

ARRANGEMENT FOR MEASURING THE POWER TRANSMITTED THROUGH AN ELECTROMAGNETIC WAVEGUIDE

John Bernard Setchfield, London, England, assignor to International Standard Electric Corporation, New York, N. Y., a corporation of Delaware Application August 20, 1952, Serial No. 305,347

Claims priority, application Great Britain September 7, 1951

5 Claims. (Cl. 324—95)

The present invention relates to arrangements for measuring or indicating the power transmitted through an electromagnetic waveguide.

This is usually done by tapping off a small portion of the power by means of a probe or loop inserted into the guide, and rectifying the current so obtained with a crystal rectifier. The rectified current is then supplied to a measuring or indicating instrument of some suitable type from which it can be determined whether any power is present in the guide, or if it is varying. If the instrument is suitably calibrated, it may be used for measuring the power transmitted through the guide. This method of tapping off the power has the objection that a probe or loop does not have a uniform frequency response and the results are therefore not representative when the guide is transmitting a wide band of frequencies.

According to the present invention, this difficulty is avoided by cutting a circular hole through one of the walls of the guide, and connecting a rectifier outside the guide diametrically across the hole, the line joining the points of connection of the rectifier being parallel to the lines of electric force in the guide.

When a rectangular waveguide is used, the hole is preferably cut in one of the narrower walls of the guide.

The invention will be described with reference to the accompanying drawings in which:

Fig. 1 shows a top view of a rectangular waveguide section provided with a rectifier arranged according to the invention for measuring the power transmitted through the guide;

Fig. 2 shows a side elevation of the waveguide section;

Fig. 3 shows a sectional view of the arrangement as seen in the direction of the arrows A—A in Fig. 2;

Fig. 4 shows a sectional view of the arrangement as seen in the direction of the arrows B—B in Fig. 2; and Fig. 5 shows to a larger scale details of the housing of the rectifying crystal and its terminal arrangements.

The waveguide section 1 is provided with the usual flanges 2, 3 by means of which it may be bolted to other waveguide sections (not shown).

As shown in Fig. 3, according to the invention, a circular hole 4 is cut on one of the narrow walls of the guide section. A crystal rectifier 5 is enclosed in a metal box 6 through which is drilled a cylindrical hole 7 coaxial with the hole 4. The box is closed by a metal plate 8.

The rectifier 5 is shown to a larger scale in Fig. 5, and consists of a cylindrical cartridge 9 of insulating material enclosing a crystal (not shown) and having a metal terminal cap 10 at one end, to which the catswhisker electrode (not shown) is connected, and a metal terminal shank 11 at the other end, on which the crystal is mounted. A cylindrical hole is drilled through the upper wall of the box 6 (Fig. 3), into which hole the terminal cap 10 fits, a thin bush 12 of insulating material being inserted to insulate the cap 10 from the box 6 for direct current, while providing a coupling capacity for high frequency currents. A socket element 13 (Figs. 3 and 5) for the shank 11 comprises a screwed metal head 14 which screws into the lower part of the box 6 and metal contact springs 15 secured to the head 14, which form a socket into which the shank 11 fits, making electrical contact herewith.

Connection for direct current is made to the terminal cap 10 by a spring 16 (Fig. 2) mounted between two washers on a long screw 17 which passes through a hole in an insulating block 18 (most clearly seen in Fig. 1) mounted on the side of the metal box 6. The screw 17 is fixed by a nut 19 (Fig. 2) at the lower end, and a second nut 20 and a pair of washers 21 provide means for attaching a connecting wire (not shown) to the screw.

The diameter of the cylindrical cavity 7 should be such that it operates as a section of cylindrical guide, the cut-off frequency of which is above the range of frequencies transmitted through the guide section. With this arrangement it is found that if a direct current meter (not shown) be connected between the screw 17 and the wall of the waveguide, a substantially constant relation between the meter reading and the power transmitted through the guide section is obtained over a wide frequency band, because the frequency characteristics of the rectifier, and of the cavity 7, slope in opposite directions and can be made substantially to compensate one another.

It should be added that the closing plate 8 is not essential and could be omitted, since practically no energy would be transmitted through the cavity in the box 6.

It will be understood that although the invention has been illustrated in its application to a rectangular waveguide, it could also be applied to waveguides having other forms of cross-section, such as circular guides. It is only necessary to cut a circular hole in the wall of the guide as described, and to connect a rectifier diametrically across the hole outside the guide so that the line joining the points of connection is parallel to the lines of electric force in the guide.

While the principles of the invention have been described above in connection with specific embodiments, and particular modifications thereof, it is to be clearly understood that this description is made by way of example and not as a limitation on the scope of the invention.

What I claim is:

1. An arrangement for measuring, or indicating, power transmitted through a wave guide, characterized by an aperture formed in a wall of the wave guide, so positioned and dimensioned as to pass only a small fraction of the transmitted power, a rectifier, means mounting said rectifier diametrically across said aperture outside said wave guide, the rectifier being mounted physically parallel and in close proximity to the lines of electric force in said guide.

2. The arrangement according to claim 1 wherein said wave guide is of rectangular cross section, and said aperture is circular in one of the narrower walls of the wave guide.

3. The arrangement according to claim 1 wherein said aperture is circular, and further comprising a metal box coupled to said wave guide and having a cylindrical cavity arranged coaxially with said circular aperture, the cavity being dimensioned so that it has a cut-off frequency above the range of frequencies transmitted through the wave guide, means mounting said rectifier in said box adjacent said circular aperture, and means insulating one terminal of said rectifier from said box.

4. The arrangement according to claim 3 wherein said insulated terminal of said rectifier comprises means for coupling a meter thereto whereby the power transmitted through said wave guide may be measured.

5. An arrangement for measuring or indicating power transmitted through a rectangular wave guide characterized by a circular aperture formed in one of the narrower walls of said wave guide, the aperture being so positioned and dimensioned as to pass only a small fraction of the transmitted power, a metal box mounted to the wall of said wave guide surrounding said aperture, said metal box having a cylindrical cavity coaxial with said circular aperture dimensioned so that its cut-off frequency is above the range of frequencies transmitted through said wave guide, a rectifier, means mounting said rectifier in said metal box across said circular aperture so that it is parallel to the electric lines of force in said wave guide, means insulating one terminal of said rectifier from said metal box, and means for coupling a meter to said one terminal whereby the power transmitted through said wave guide may be measured.

References Cited in the file of this patent

UNITED STATES PATENTS

| | | |
|---|---|---|
| 2,253,589 | Southworth | Aug. 26, 1941 |
| 2,416,694 | Howard | Mar. 4, 1947 |
| 2,477,347 | Posey | July 26, 1949 |
| 2,518,931 | Pound | Aug. 15, 1950 |
| 2,587,055 | Marshall | Feb. 26, 1952 |
| 2,589,843 | Montgomery | Mar. 18, 1952 |